US007889462B2

(12) United States Patent
Spindler et al.

(10) Patent No.: US 7,889,462 B2
(45) Date of Patent: Feb. 15, 2011

(54) PROTECTIVE CIRCUIT FOR PROTECTION OF AN APPLIANCE, IN PARTICULAR AN ELECTRIC MOTOR, AGAINST THERMAL OVERLOADING

(75) Inventors: Konrad Spindler, Ursensollen (DE); Josef Koller, Burglengenfeld (DE); Markus Meier, Rieden (DE); Johann Seitz, Amberg (DE); Andreas Fritsch, Kümmersbruck (DE)

(73) Assignee: Siemens Aktiengesellschaft, Munich (DE)

( * ) Notice: Subject to any disclaimer, the term of this patent is extended or adjusted under 35 U.S.C. 154(b) by 115 days.

(21) Appl. No.: 12/310,677

(22) PCT Filed: Sep. 6, 2006

(86) PCT No.: PCT/DE2006/001558

§ 371 (c)(1),
(2), (4) Date: Mar. 4, 2009

(87) PCT Pub. No.: WO2008/028431

PCT Pub. Date: Mar. 13, 2008

(65) Prior Publication Data
US 2010/0039736 A1    Feb. 18, 2010

(51) Int. Cl.
*H02H 5/04* (2006.01)
(52) U.S. Cl. .............................. 361/24; 361/25; 361/26; 361/103; 361/124; 318/471; 318/472; 318/473; 318/434; 318/432; 318/445; 318/700; 318/822; 318/364; 388/903; 388/909; 337/298
(58) Field of Classification Search .................... 361/24, 361/25, 26, 103, 124; 318/471, 472, 473, 318/434, 432, 445, 700, 822, 364, 221; 388/903, 388/909; 337/298
See application file for complete search history.

(56) References Cited

U.S. PATENT DOCUMENTS

| 4,266,257 | A | * | 5/1981 | Rudich, Jr. .................... 361/27 |
| 4,816,958 | A | * | 3/1989 | Belbel et al. ............... 361/93.7 |
| 5,907,204 | A | * | 5/1999 | Matsushima et al. ...... 310/68 C |
| 6,175,220 | B1 | * | 1/2001 | Billig et al. .................. 323/239 |
| 6,335,577 | B1 | * | 1/2002 | Baba ............................ 307/28 |
| 6,912,108 | B2 | * | 6/2005 | Erixon ........................ 361/16 |
| 7,098,626 | B2 | * | 8/2006 | Seo et al. ..................... 320/150 |
| 7,491,034 | B2 | * | 2/2009 | Jayanth ...................... 417/44.1 |

(Continued)

FOREIGN PATENT DOCUMENTS

WO    WO 2005/122354 A1    12/2005

*Primary Examiner*—Rita Leykin
(74) *Attorney, Agent, or Firm*—Harness, Dickey & Pierce, P.L.C.

(57) ABSTRACT

At least one embodiment of the invention relates to a protective circuit for protection of an appliance, in particular of an electric motor, against thermal overloading. In at least one embodiment, the protective circuit includes a first and a second terminal for connecting a temperature detection element; a detection unit for detecting whether a resistance value of the temperature detector element which is connected between the first and the second terminals, is in a first or a second resistance range; a short-circuit detector for identifying whether there is a short circuit between the first and the second terminals; signaling outputs for emitting signal messages to an evaluation unit when the detected resistance value is in the second resistance range and/or when a short circuit has been identified by the short-circuit detector; and a third terminal, which is connected to the second terminal via a predetermined resistance.

12 Claims, 1 Drawing Sheet

U.S. PATENT DOCUMENTS 7,648,342 B2 * 1/2010 Jayanth .................... 417/44.11
7,705,549 B2 * 4/2010 Bielesch ..................... 318/268
2005/0206347 A1 * 9/2005 Seo et al. .................... 320/150

* cited by examiner

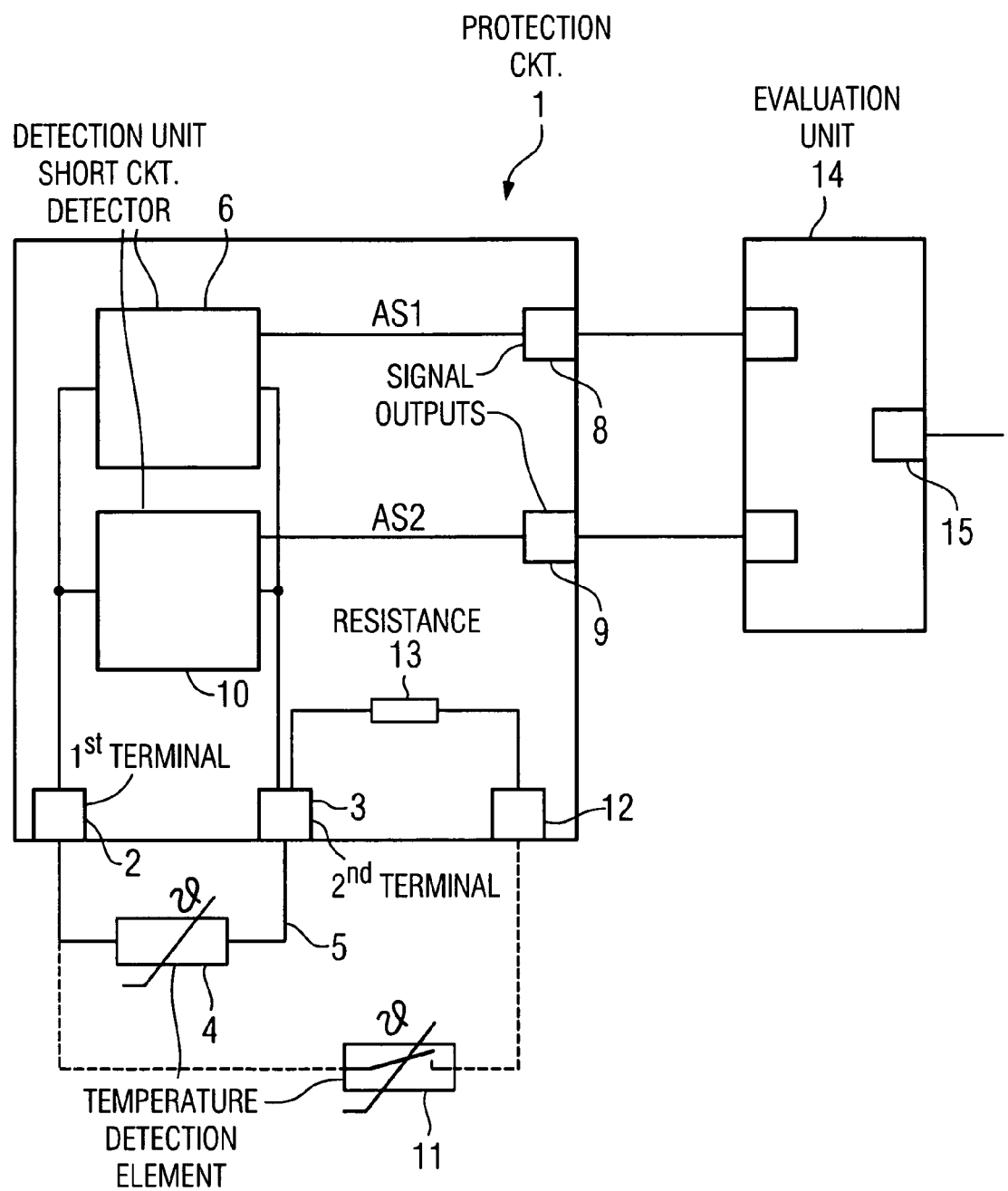

PROTECTIVE CIRCUIT FOR PROTECTION OF AN APPLIANCE, IN PARTICULAR AN ELECTRIC MOTOR, AGAINST THERMAL OVERLOADING

PRIORITY STATEMENT

This application is the national phase under 35 U.S.C. §371 of PCT International Application No. PCT/DE2006/001558 which has an International filing date of Sep. 6, 2006, which designated the United States of America, the entire contents of each of which are hereby incorporated herein by reference.

FIELD OF THE INVENTION

At least one embodiment of the invention generally relates to a protective circuit for protection of an appliance, in particular an electric motor, against thermal overloading.

BACKGROUND

In addition to an overload relay, which identifies overloading of a motor on the basis of the current drawn by the motor, thermistor protective circuits are also used for protection against thermal motor overloading, and these circuits detect and evaluate the temperature of a motor winding. Various temperature detector elements are used for this purpose, for example temperature sensors, in particular PTC thermistors (PTC: positive temperature coefficient), PT100 sensors and KTY sensors, whose electrical resistance varies as a function of the detected temperature. In particular, the resistance of a temperature detector element such as this is in a first range for as long as the motor winding is in a temperature range in which there are no problems. The second resistance range, whose resistance values are greater, for example, than those of the first resistance range, then corresponds to a temperature above a temperature threshold value.

Furthermore, so-called thermo-click elements, which are also referred to as temperature monitors, can also be used as temperature detector elements. These are generally represented by simple switches which are normally designed using a bimetallic strip, which is closed in the first temperature range and is opened in a second temperature range, that is to say above the temperature threshold value. This means that the resistance changes from virtually 0Ω to an infinite resistance.

In the case of the first-mentioned temperature detector elements, the temperature sensors, overloading of the motor is evaluated by way of the resistance change of the temperature detector elements within predefined value ranges. In contrast, in its normal field of application, the thermo-click element opens the circuit through a motor winding on reaching the temperature threshold value. In contrast, temperature sensors are evaluated by means of a protective circuit which essentially determines the electrical resistance of the relevant temperature detector elements and emits a message signal to a switch, to an evaluation circuit or the like, thus, for example, initiating a shutdown of the appliance or starting some other predetermined function when a thermal overload is identified as a function of the measured temperature.

Protective circuits such as these are frequently likewise provided with short-circuit detectors, which likewise result in the corresponding message signal being emitted and thus, for example, initiate a shutdown of the appliance to be protected when a short circuit occurs in the sensor circuit. Without this short-circuit identification, it is no longer possible to identify a thermal overload when a conductor short-circuit occurs, since it is no longer possible to identify an increase in the resistance of the temperature sensor. Since short-circuit identification is necessary in order to obtain a specific license, for example ATEX (that is to say the appliance can be used for protection of motors in explosion-hazard areas), it is desirable to use a protective circuit such as this with short-circuit identification.

If one wishes to use a protective circuit such as this for temperature sensors of the abovementioned type, for example PTC thermistors, PT100 sensors and KTY sensors, as well as for thermo-click elements, the closed state of the thermo-click element is identified in the normal state, that is to say at temperatures in the first temperature range, as a short circuit through the protective circuit, which then initiates a shutdown of the appliance.

In consequence, until now, it has not been possible to use a protective circuit which is provided for temperature sensors in conjunction with a thermo-click element at the same time.

Until now, only protective circuits which evaluate temperature sensors without short-circuit identification have been known, which are therefore also suitable for evaluation of thermo-click elements, or circuits for thermistors which have short-circuit identification and are therefore not suitable for evaluation of thermo-click elements. In addition, evaluation circuits are already known in which it is possible to use adjustment parameters or configuration to choose between operation with short-circuit identification and operation without short-circuit identification.

SUMMARY

At least one embodiment of the present invention provides a protective circuit for protection of an appliance against thermal overloading, in which thermal overloading can be detected not only by temperature sensors but also alternatively by thermo-click elements.

At least one embodiment of the invention provides an evaluation circuit which makes it possible to choose between operation with short-circuit identification and operation without short-circuit identification, without any additional adjustment elements or configuration being required for this purpose.

According to at least one embodiment of the invention, a protective circuit is provided for protection of an appliance, in particular an electric motor, against thermal overloading. The protective circuit comprises a first and a second connection for connection of a temperature detector element, a detection unit for detection of whether a resistance value of a temperature detector element which is connected between the first and the second connection is in a first or in a second resistance range, and a short-circuit detector for identification of whether there is a short circuit between the first and the second connection. Furthermore, signaling outputs are provided for emission of message signals to an evaluation circuit when the detected resistance value is in the resistance range or when a short circuit is identified by the shirt-circuit detector, or both have occurred. A third connection is also provided, and is connected to the second connection via a predetermined resistance.

The protective circuit according to at least one embodiment of the invention now makes it possible to connect both temperature sensors and thermo-click elements in such a way that thermal overloading can be detected both by temperature sensors and by a thermo-click element, and it is nevertheless possible to identify a short circuit between the first and the second connection, even when a thermo-click element is connected to the protective circuit for temperature detection. It is thus possible to operate the protective circuit either with a temperature sensor whose electrical resistance depends on the detected temperature, or with a thermo-click element. Furthermore, passive switching of the protective circuit can be achieved, without having to implement other measures in the overall system, by means of an externally applied short circuit between the first and the third connection.

Furthermore, the predetermined resistance can be chosen such that no short circuit is identified by the short-circuit detector even when there is a short circuit between the first and the third connection. This prevents the thermo-click element initiating the short-circuit identification and emitting the message signal, and thus for example shutting down the appliance, in the normal state, that is to say when no overload is detected, when this thermo-click element is connected to the protective circuit.

The predetermined resistance is preferably in the first resistance range. This first resistance range is defined by the detection unit as the resistance range which corresponds to a temperature range in which no overload has occurred.

BRIEF DESCRIPTION OF THE DRAWINGS

One example embodiment of the present invention will be explained in more detail in the following text with reference to the attached drawings.

FIG. 1 shows a block diagram of a protective circuit 1 according to an embodiment of the invention.

DETAILED DESCRIPTION OF THE EXAMPLE EMBODIMENTS

FIG. 1 shows a block diagram of a protective circuit 1 according to an embodiment of the invention having a first connection 2 and a second connection 3, in order to connect a temperature sensor, such as a PTC thermistor, a PT100 sensor, a KTY sensor or some other temperature sensor as a temperature detector element whose electrical resistance is a function of the detected temperature and in particular has a positive temperature gradient, that is to say the electrical resistance increases as the temperature rises.

The temperature sensor 4 is connected via connecting lines 5 to the first and the second connection 2, 3 of the protective circuit 1. The protective circuit 1 has a detection unit 6 which detects whether a resistance value of the temperature sensor 4 which is connected between the first and the second connection 2, 3 is in a first or in a second resistance range. The first resistance range is preferably a resistance range with low resistance values, and the second resistance range is preferably a range with higher resistance values, such that the detection unit identifies whether the temperature at the temperature sensor 4 is in the first or in the second temperature range.

If it is detected that the resistance of the temperature sensor 4 is in the first resistance range, then no thermal overload has occurred, because the temperature is within the first temperature range, in which there are no problems. If the resistance value of the temperature sensor 4 is in the second resistance range, thermal overloading is detected and a first message signal AS1 is emitted via a first signaling output 8.

Furthermore, a short-circuit detector 10 is provided which is likewise connected to the first and the second connection of the protective circuit 1 and which detects whether a short circuit has occurred between the first and the second connection, that is to say whether the electrical resistance between the first and the second connection 2, 3 is 0 ohms or virtually 0 ohms. It is therefore possible to identify a short circuit between the connecting lines 5 and the temperature sensor 4, and a second message signal AS2 is generated as a function of this, and is emitted to the second signaling output 9. Both signaling outputs 8, 9 are connected to an evaluation unit 14 which, for example, causes a motor to be shut down as a function of a fixed or configurable function, via its output 15. In one simple embodiment, for example, the evaluation unit 14 comprises an OR gate for logically linking the two message signals.

If one now wishes to use a thermo-click element 11 instead of the temperature sensor 4 and this were to be connected to the first and the second connection 2, 3 of the protective circuit 1, then this would lead to the short-circuit detector 10 identifying a short circuit, since the thermo-click element 11 essentially represents a switch which is closed below a temperature threshold value. This means that, if the temperature which is detected by the thermo-click element 11 is below a predetermined temperature threshold value, then the thermo-click element 11 has virtually no electrical resistance, which would incorrectly be detected as a short circuit when connected to the first and the second connection 2, 3 of the protective circuit 1.

In order to make it possible for the protective circuit 1 to be operated with thermo-click elements as well, a third connection 12 is provided and is connected to the second connection via a resistance element 13 which has a predetermined resistance value. An embodiment of the invention now provides that, when a thermo-click element 11 is being used as a temperature detector element, this is connected between the first and the third connection 2, 12 in the protective circuit 11. In this case, the thermo-click element 11 is connected in series with the resistance element 13 in such a way that, even when the thermo-click element 11 is in the closed state, the short-circuit detector 10 cannot detect a short circuit.

If the temperature threshold value is exceeded, then the thermo-click element 11 opens, and the connection between the first connection and the third connection, that is to say between the first and the second connection, is broken. A very high resistance is detected which, as described above, is in the second resistance range, as a result of which the detection unit 6 identifies thermal overloading and emits a corresponding message signal AS1 at the signal output 8.

It is also possible to additionally completely deactivate the protective circuit 1 by connecting a wire link between the first connection and the third connection, which would not be possible in the case of conventional protective circuits because of the short-circuit identification, since this would cause the message signal to be emitted immediately. It is therefore possible to dispense with one additional switching element within the protective circuit 1, by which the protective circuit 1 can be deactivated while it is not intended to use a temperature detector element for detection of thermal overloading.

The resistance value of the resistance element 13 is preferably chosen such that the resistance value is within the first resistance range, such that, when the thermo-click element 11 is closed, the protective circuit 1 detects a resistance value which indicates that no thermal overloading has occurred. For example, the predetermined resistance value of the resistance element 13 may correspond to the resistance value of a temperature sensor 4 which can be used at room temperature (provided that a thermal overloading situation does not occur at room temperature).

This makes it possible to produce a protective circuit 1 which is suitable for operation either with a temperature sensor whose resistance value depends on the temperature or with a thermo-click element, that is to say a temperature switch and in which, furthermore, it is also possible to identify a short circuit when using a temperature sensor, in order to comply with the specified requirements, for example those for ATEX licensing.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A protective circuit for protection of an appliance against thermal overloading, comprising:
    a first and a second connection to connect a temperature detector element;
    a detection unit to detect whether a resistance value of the temperature detector element, connected between the first and the second connection, is in a first or a second resistance range;
    a short-circuit detector to detect whether a short circuit is present between the first and the second connection;
    signaling outputs to emit message signals to an evaluation unit at least one of when the detected resistance value is in the second resistance range and when a short circuit is detected by the short-circuit detector; and
    a third connection, connected to the second connection via a resistance.

2. The protective circuit as claimed in claim 1, wherein the resistance is chosen such that the short-circuit detector does not identify a short circuit even when there is a short circuit between the first and the third connection.

3. The protective circuit as claimed in claim 1, wherein the resistance is in the first resistance range.

4. The protective circuit as claimed in claim 1, wherein resistance values in the first resistance range are relatively lower than resistance values in the second resistance range.

5. The protective circuit as claimed in claim 1, wherein the protective circuit is for protection of an electric motor against thermal overloading.

6. The protective circuit as claimed in claim 2, wherein resistance values in the first resistance range are relatively lower than resistance values in the second resistance range.

7. A protective circuit for protection of an appliance against thermal overloading, comprising:
    first and second means for connection of a temperature detector element;
    detection means for detection of whether a resistance value of the temperature detector element, connected between the first and the second means, is in a first or a second resistance range;
    short-circuit detector means for detecting whether a short circuit is present between the first and the second means;
    means for emitting message signals to an evaluation unit at least one of when the detected resistance value is in the second resistance range and when a short circuit is detected by the short-circuit detector means; and
    third means for connection, connected to the second means via a resistance.

8. The protective circuit as claimed in claim 7, wherein the resistance is chosen such that the short-circuit detector means does not identify a short circuit even when there is a short circuit between the first and the third means.

9. The protective circuit as claimed in claim 7, wherein the resistance is in the first resistance range.

10. The protective circuit as claimed in claim 7, wherein resistance values in the first resistance range are relatively lower than resistance values in the second resistance range.

11. The protective circuit as claimed in claim 7, wherein the protective circuit is for protection of an electric motor against thermal overloading.

12. The protective circuit as claimed in claim 8, wherein resistance values in the first resistance range are relatively lower than resistance values in the second resistance range.

* * * * *